US008894078B2

(12) United States Patent
Brewin et al.

(10) Patent No.: US 8,894,078 B2
(45) Date of Patent: Nov. 25, 2014

(54) JUVENILE WALKER

(71) Applicant: Cosco Management, Inc., Wilmington, DE (US)

(72) Inventors: Joseph F Brewin, Franklin, MA (US); Gerald C Palmer, Florence, KY (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 13/919,795

(22) Filed: Jun. 17, 2013

(65) Prior Publication Data

US 2013/0341891 A1    Dec. 26, 2013

Related U.S. Application Data

(60) Provisional application No. 61/662,688, filed on Jun. 21, 2012.

(51) Int. Cl.
*A47D 13/04* (2006.01)
*B62B 7/04* (2006.01)
*B62B 7/10* (2006.01)
*A47D 1/00* (2006.01)
*A61H 3/04* (2006.01)

(52) U.S. Cl.
CPC . *B62B 7/04* (2013.01); *B62B 7/105* (2013.01); *B62B 2205/06* (2013.01); *A47D 13/04* (2013.01); *A47D 1/004* (2013.01); *A61H 3/04* (2013.01)
USPC ........ 280/87.051; 280/658; 280/649; 482/68; 297/5

(58) Field of Classification Search
CPC ... A47D 13/043; A47D 13/004; A47D 1/004; A47B 9/19; A61H 3/04; B62B 11/00; B62B 7/10; B62B 7/105; B62B 2205/06
USPC ................ 280/658, 87.051, 657, 649, 764.1; 108/120; 482/68; 297/5; 292/63, 64, 292/95, 109, 116, 119, 121, 122, 127, 96, 292/194, 213, 214, 219, 220, 227, 237, 262, 292/267, 270, 274, 278, DIG. 37, DIG. 63
See application file for complete search history.

(56) References Cited

U.S. PATENT DOCUMENTS

| | | | | |
|---|---|---|---|---|
| 3,596,554 | A | * | 8/1971 | Low et al. ..................... 411/348 |
| 4,359,242 | A | | 11/1982 | Gerken et al. |
| 4,433,869 | A | * | 2/1984 | Payne et al. ........................ 297/5 |
| 4,576,392 | A | * | 3/1986 | Quinlan, Jr. ............. 280/87.051 |
| 4,615,523 | A | * | 10/1986 | Chen .......................... 280/87.05 |
| 4,759,541 | A | * | 7/1988 | Chen ............................... 482/68 |
| 4,799,700 | A | | 1/1989 | Knoedler et al. |
| 4,884,799 | A | * | 12/1989 | Chai ............................... 482/66 |
| 5,324,064 | A | | 6/1994 | Sumser et al. |

(Continued)

FOREIGN PATENT DOCUMENTS

JP    2003052495 A  *  2/2003  ............. A47D 13/04

*Primary Examiner* — J. Allen Shriver, II
*Assistant Examiner* — Steve Clemmons
(74) *Attorney, Agent, or Firm* — Barnes & Thornburg LLP

(57) ABSTRACT

A juvenile walker includes a rolling base and a child restraint coupled to the rolling base to move therewith. The child restraint is adapted to support a child using the juvenile walker. The rolling base includes a lift carrier and a child-restraint lift coupled to both the child restraint and the lift carrier to vary a height of the child restraint above ground.

48 Claims, 11 Drawing Sheets

(56) References Cited

U.S. PATENT DOCUMENTS

| | | | |
|---|---|---|---|
| 5,351,978 A * | 10/1994 | Chen | 280/87.051 |
| 5,564,724 A * | 10/1996 | Huang | 280/87.051 |
| 6,120,045 A | 9/2000 | Rosko | |
| 6,306,066 B1 * | 10/2001 | Yang | 482/68 |
| 2004/0119258 A1 * | 6/2004 | Yoo | 280/87.051 |
| 2010/0301586 A1 * | 12/2010 | Cheng | 280/649 |

* cited by examiner

JUVENILE WALKER

PRIORITY CLAIM

This application claims priority to U.S. Provisional Application Ser. No. 61/662,688 filed Jun. 21, 2012, which is hereby expressly incorporated by reference herein.

BACKGROUND

The present disclosure relates to a walker, and in particular to a walker for use by children. More particularly, the present disclosure relates to a height-adjustable juvenile walker.

SUMMARY

A juvenile walker in accordance with the present disclosure includes a rolling base and a child restraint coupled to the rolling base to move therewith. The child restraint is adapted to support a child using the juvenile walker. The rolling base includes a lift carrier and a child-restraint lift coupled to both the child restraint and the lift carrier to vary a height of the child restraint above ground.

In illustrative embodiments, the juvenile walker further includes a restraint height adjuster that is coupled to both the child restraint and the child-restraint lift. The restraint height adjuster is configured to provide means for adjusting a height of the child restraint relative to the ground underlying the rolling base to cause the juvenile walker to be arranged to accommodate children of varying heights in response to application of a compression force which frees portions of the restraint height adjuster to move in response to application of an upward force that frees the child restraint to move up and down relative ground while blocking inadvertent movement of the child restraint through the use of the two forces.

In illustrative embodiments, the restraint height adjuster includes an adjuster mount, a height lock, and a height-lock actuator. The adjuster mount is coupled to the child restraint in a fixed position. The height lock is coupled to the adjuster mount and the child-restraint lift to move between a locked position and an unlocked position. The height-lock actuator is coupled to the height lock to move between an engaged position and a disengaged position. The height-lock actuator moves from the disengaged position which blocks movement of the height lock to the engaged position in response to application of the compression force applied to the height-lock actuator by a caregiver. The height lock is movable from the locked position to the unlocked position when the height-lock actuator is in the engaged position and the upward force is applied to the height lock by the caregiver. When the height lock is in the unlocked position, movement of the child restraint and child-restraint lift is permitted.

Additional features of the present disclosure will become apparent to those skilled in the art upon consideration of illustrative embodiments exemplifying the best mode of carrying out the disclosure as presently perceived.

BRIEF DESCRIPTION

The detailed description particularly refers to the accompanying figures in which:

FIG. 1 is a perspective and diagrammatic view of a juvenile walker in accordance with the present disclosure showing that the juvenile walker includes a child restraint adapted to support a child using the juvenile walker, a rolling base coupled to the child restraint to support the child restraint at various heights above ground, and a restraint height adjuster interconnecting the rolling base and the child restraint to cause the child restraint to be retained in a first expanded-use position as suggested in FIGS. 4 and 12 and a second relatively lower expanded-use position suggested in FIGS. 6 and 13;

FIG. 2 is an exploded assembly view of the juvenile walker of FIG. 1 showing that the juvenile walker includes, from top to bottom, a seat back, a table, the restraint height adjuster, an X-shaped child-restraint lift included in the rolling base, and a lift carrier included in the rolling base;

FIG. 3 is an enlarged exploded assembly view of the restraint height adjuster of FIGS. 1 and 2 showing that the restraint height adjuster includes, from top to bottom, an upper anchor shell, an anchor-return spring, a front mount-tube receiver configured to receive a front-mount tube included in the X-shaped child-restraint lift, a lower anchor shell, first and second actuator buttons, an actuator-return spring, and an adjuster mount formed to include an anchor receiver;

Figure 1:
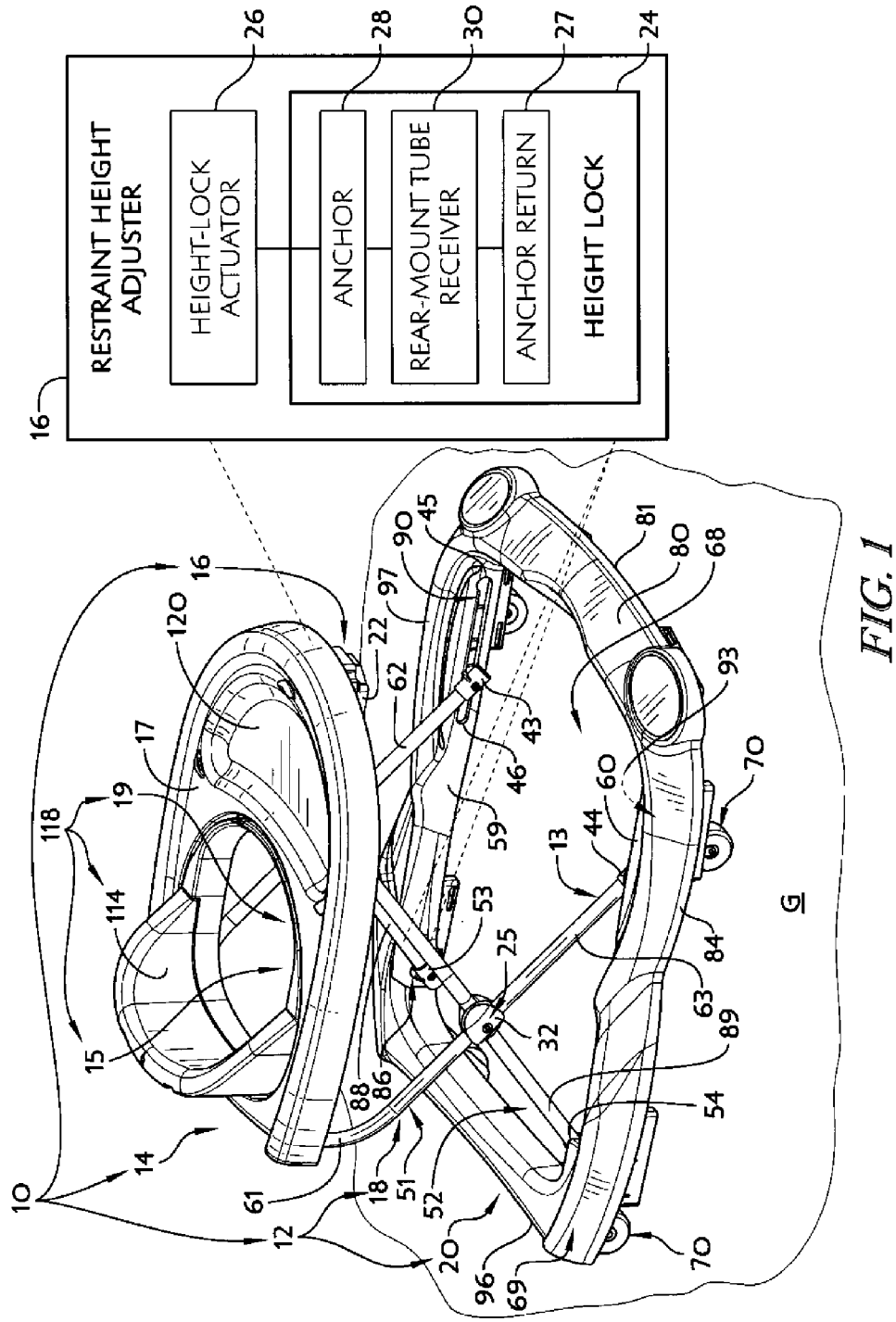
Figure 8A:
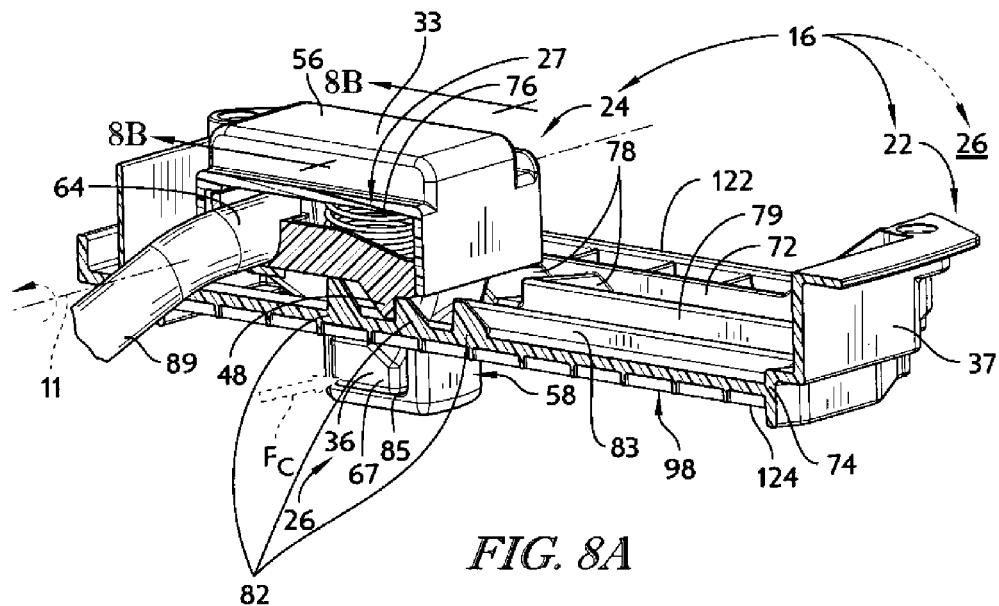
FIGS. 8A-11B are a series of views showing movement of a height-lock actuator included in the restraint height adjuster from a disengaged position as suggested in FIGS. 8A and 8B to an engaged position as suggested in FIGS. 9A and 9B so that the height lock may be moved from the locked position a suggested in FIGS. 8A-9B to an unlocked position as suggested in FIGS. 10A and 10B.
Figure 8B:
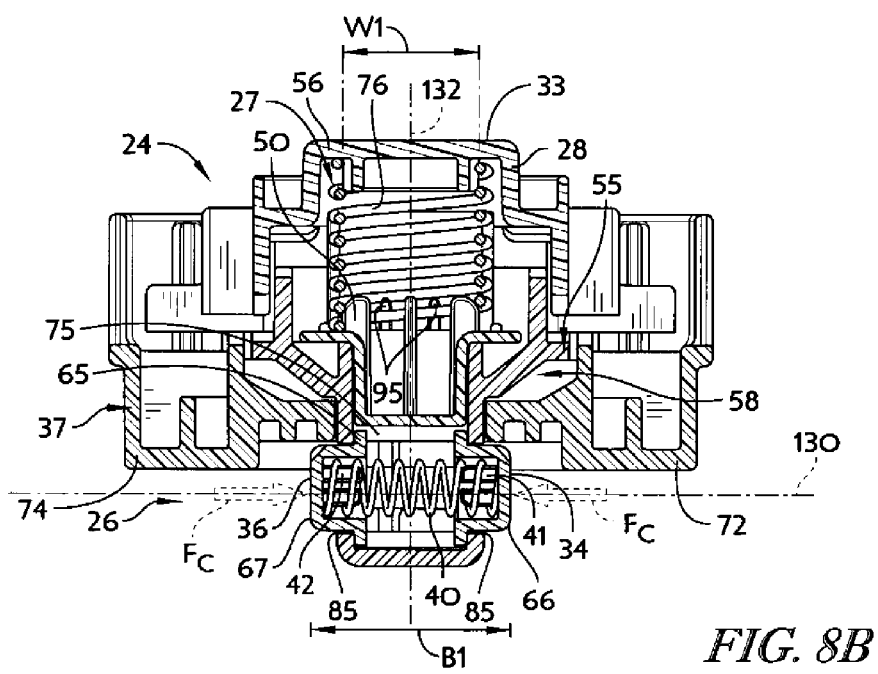
Figure 9A:
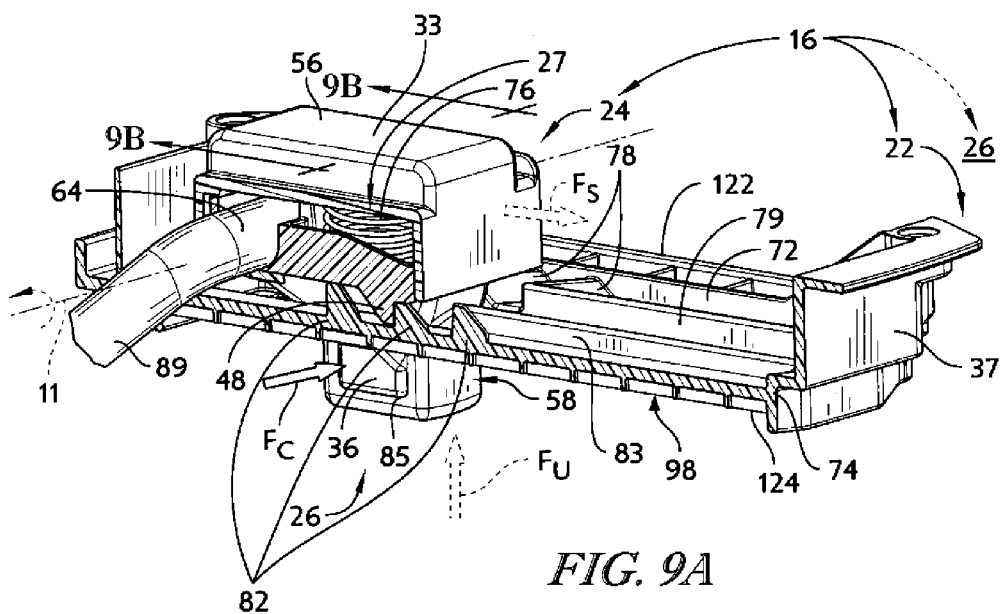
Figure 9B:
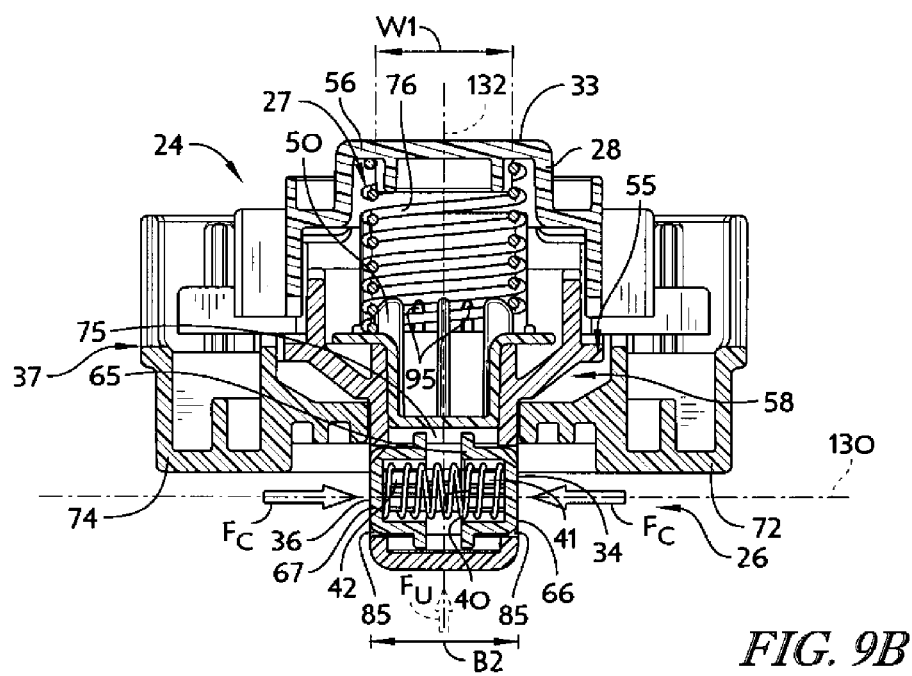
Figure 10A:
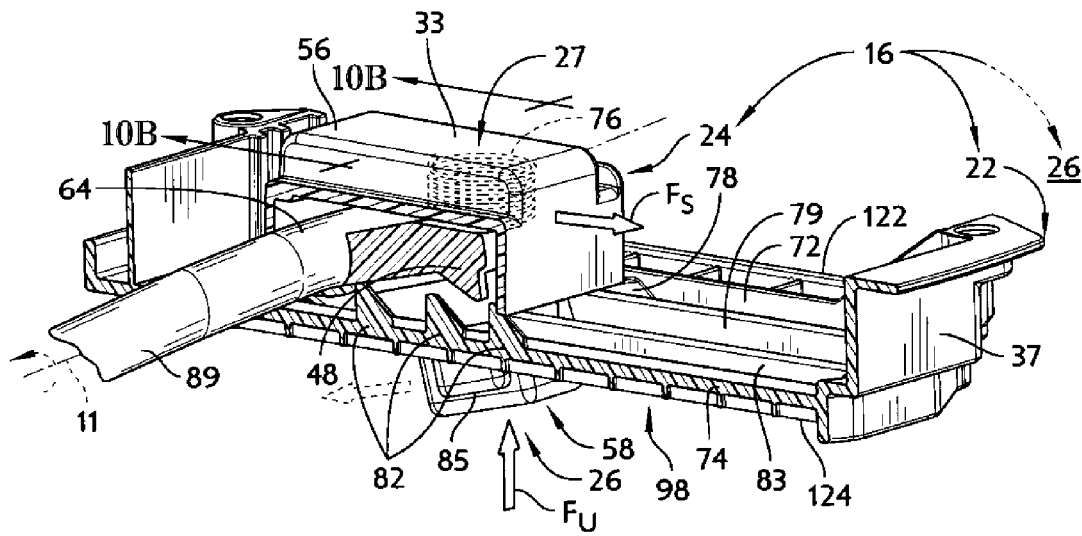
Figure 10B:
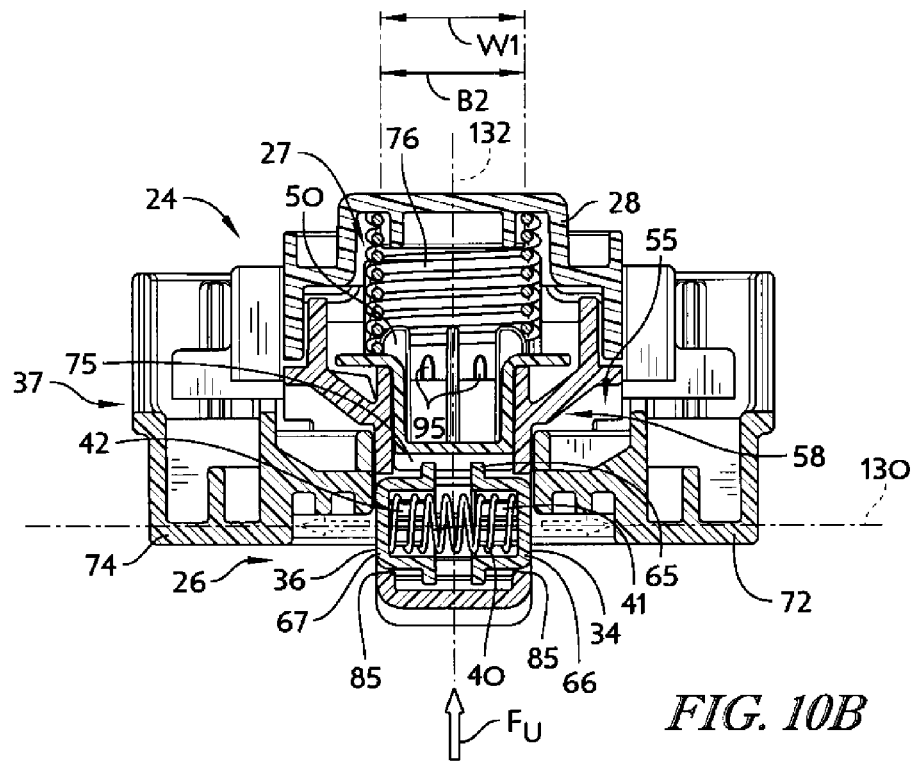
Figure 11A:
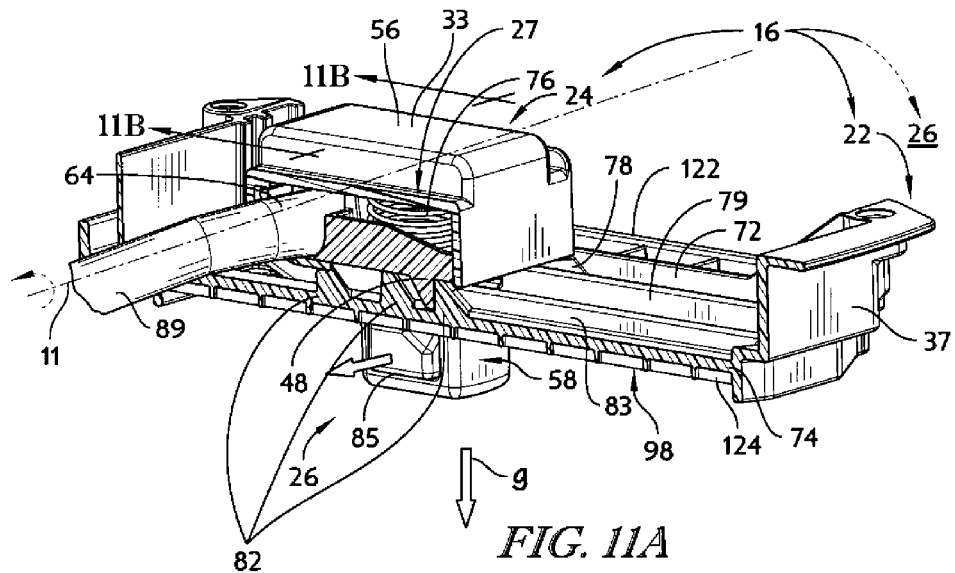
Figure 11B:
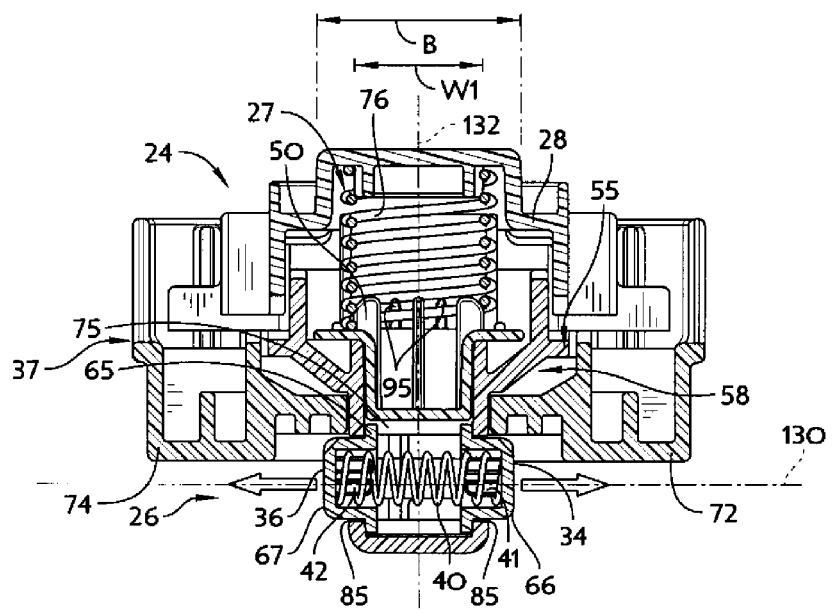
Figure 12:
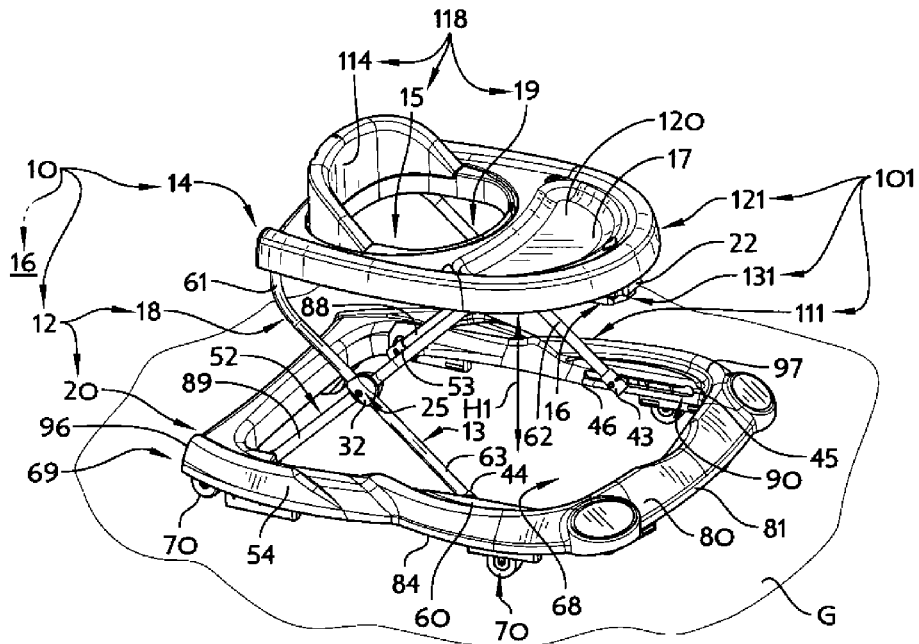
Figure 13:
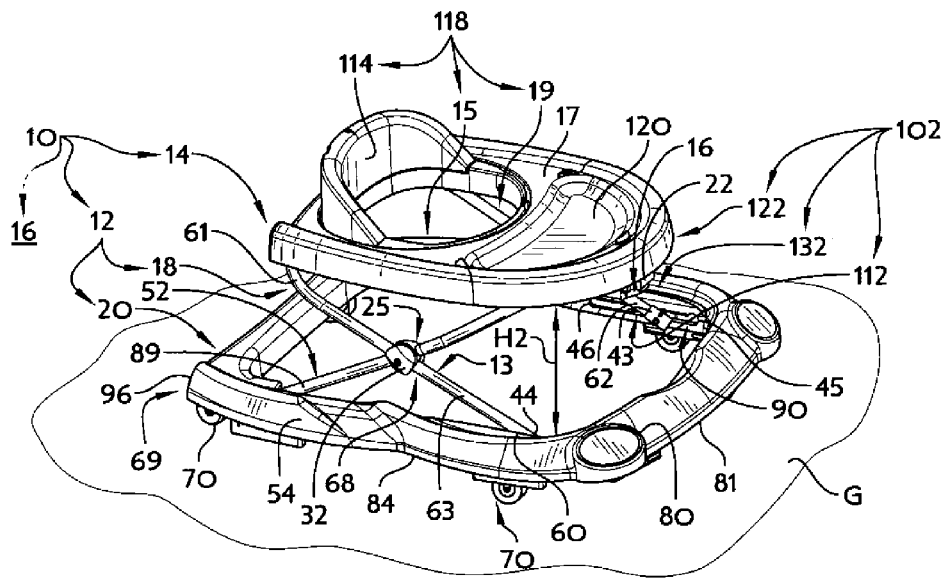
Figure 14:
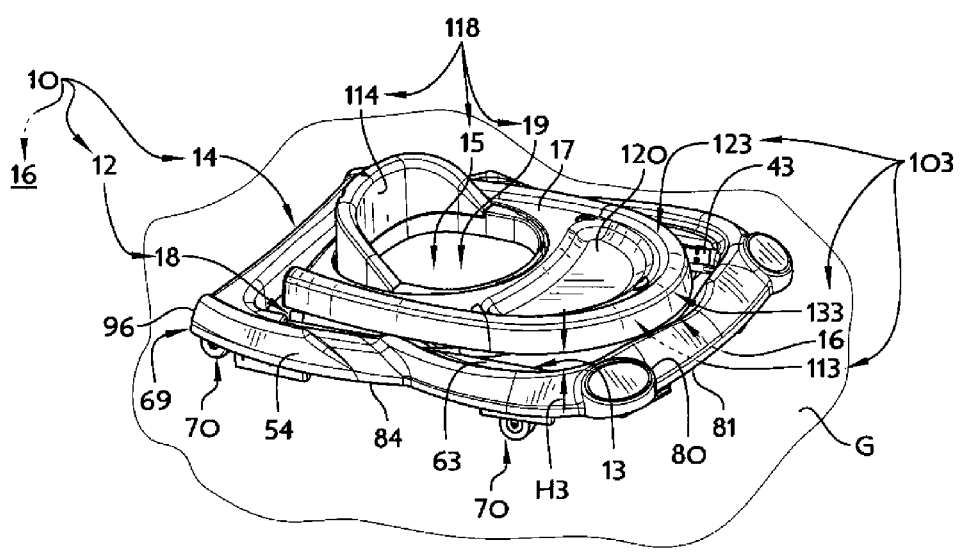

FIG. 8A is an enlarged partial perspective view of the juvenile walker of FIG. 1 with portions of the table and the restraint height adjuster broken away to reveal that the height-lock actuator is in the disengaged position which blocks upward movement of the height lock and suggesting that the height-lock actuator is moved to the engaged position by applying a compression force (phantom double arrow) to the actuator buttons to move the actuator buttons as suggested in FIG. 9A;

FIG. 8B is a sectional view taken along line 8B-8B of FIG. 8A showing the actuator buttons included in the height-lock actuator are arranged to extend out of apertures formed into the height lock when the height-lock actuator is in the disengaged position;

FIG. 9A is a view similar to FIG. 8A showing the height-lock actuator in the engaged position as a result of applying the compression force (solid double arrow) to the actuator buttons to cause the actuator buttons to move into a space formed in the height lock as suggested in FIG. 9B;

FIG. 9B is a sectional view taken along line 9B-9B of FIG. 9A showing that the actuator buttons have moved inwardly toward one another as result of applying the compression forces to the actuator buttons to cause the height lock to be freed to move in the upward direction in response to an upward force (phantom double arrow) from the locked position to the unlocked position shown in FIGS. 10A and 10B;

FIG. 10A is a view similar to FIGS. 8A and 9A showing the height-lock actuator in the engaged position and the height lock moved to the unlocked position as a result of applying the upward force to the height lock to cause an anchor included in the height lock to move out of engagement with an anchor receiver included in the adjuster mount so that the child restraint is free to move down as suggested in FIGS. 11-13;

FIG. 10B is a sectional view taken along line 10B-10B of FIG. 10A;

FIG. 11A is a view similar to FIGS. 8A, 9A, and 10A showing that after the child restraint is lowered, the height lock is biased to return to the locked position and the actuator buttons are biased to return to the disengaged position;

FIG. 11B is a sectional view taken along line 11B-11B of FIG. 11A showing that the height lock is biased toward the locked position by a lock-bias spring and that the actuator buttons are biased toward the disengaged position by an actuator-bias spring;

FIG. 12 is a perspective view of the juvenile walker of FIG. 1 in the first expanded-use position;

FIG. 13 is a view similar to FIG. 12 showing the juvenile walker lowered to the second expanded-use position; and FIG. 14 is a view similar to FIGS. 12 and 13 showing the juvenile walker lowered to the collapsed-storage position.

DETAILED DESCRIPTION

Figure 2:
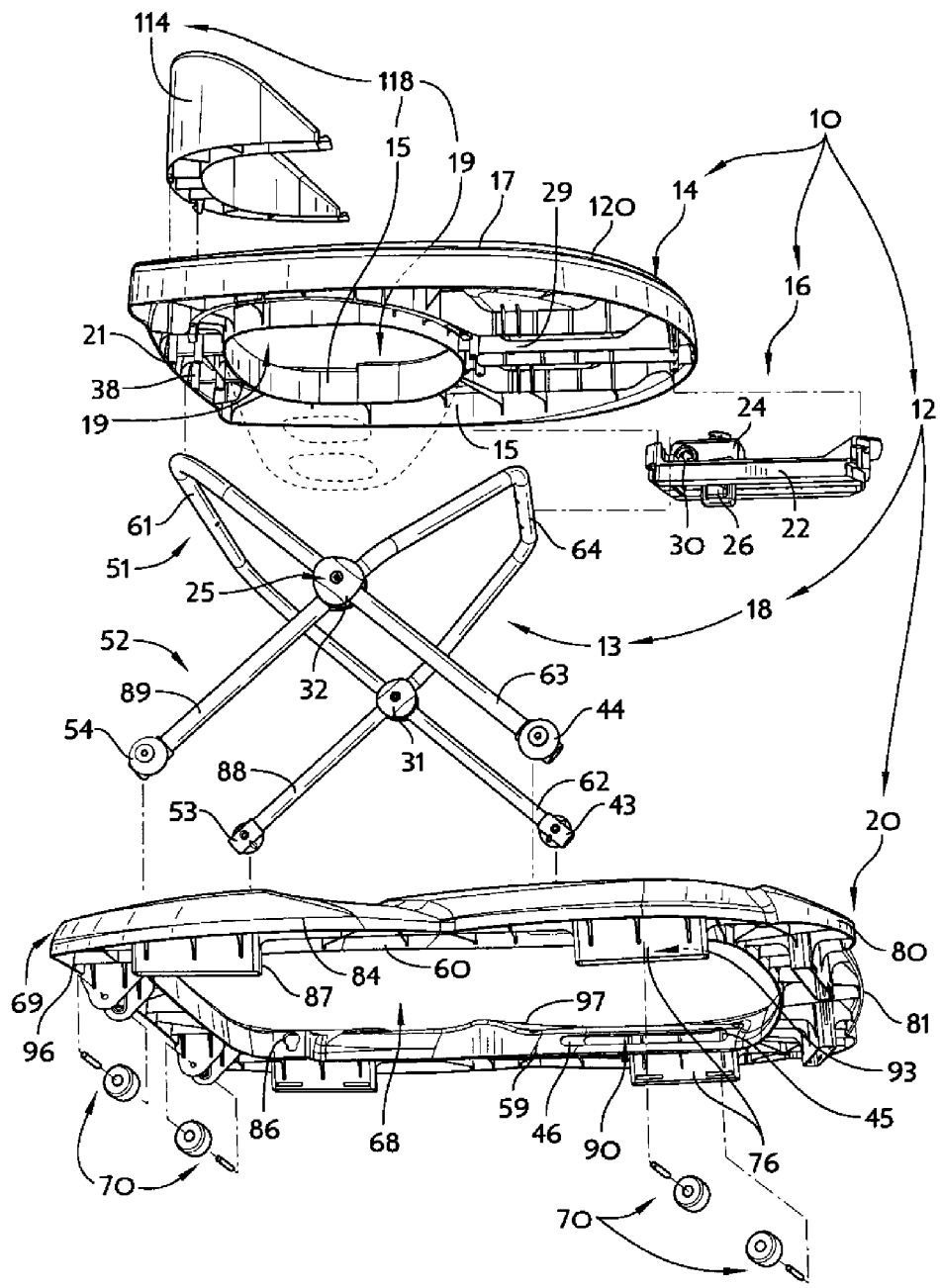

A juvenile walker 10 in accordance with the present disclosure is shown in a first expanded-use position, for example, in FIGS. 1 and 12. Juvenile walker 10 includes a rolling base 12, a child restraint 14, and a restraint height adjuster 16 as shown in FIG. 2. Child restraint 14 is coupled to rolling base 12 to move therewith when a child (not shown) is sitting in child restraint 14 attempts to walk. Juvenile walker 10 may be reconfigured from the first expanded-use position of FIG. 1, to a relatively shorter second expanded-use position shown in FIG. 13, to a relatively shorter third expanded-use position, and to a collapsed-storage position shown in FIG. 14. Restraint height adjuster 16 is coupled to both child restraint 14 and rolling base 12 and is configured to provide means for adjusting a height of child restraint 14 relative to ground underlying rolling base 12 to cause juvenile walker 10 to be arranged to accommodate children of varying heights in response to application of a compression force $F_C$ which frees portions of restraint height adjuster 16 to move in response to application of an upward force $F_U$ that frees child restraint 14 to move up and down while blocking inadvertent movement of the child restraint through the use of the forces $F_C$ and $F_U$.

Rolling base 12 includes a child-restraint lift 18 and a lift carrier 20 as shown in FIGS. 1 and 2. Lift carrier 20 is arranged to lie on and be supported by ground G for rolling movement. Child-restraint lift 18 is arranged to extend between and interconnect lift carrier 20 and child restraint 14 to cause child restraint 14 to move up and down between various heights as shown in FIGS. 12-14.

Figure 4:
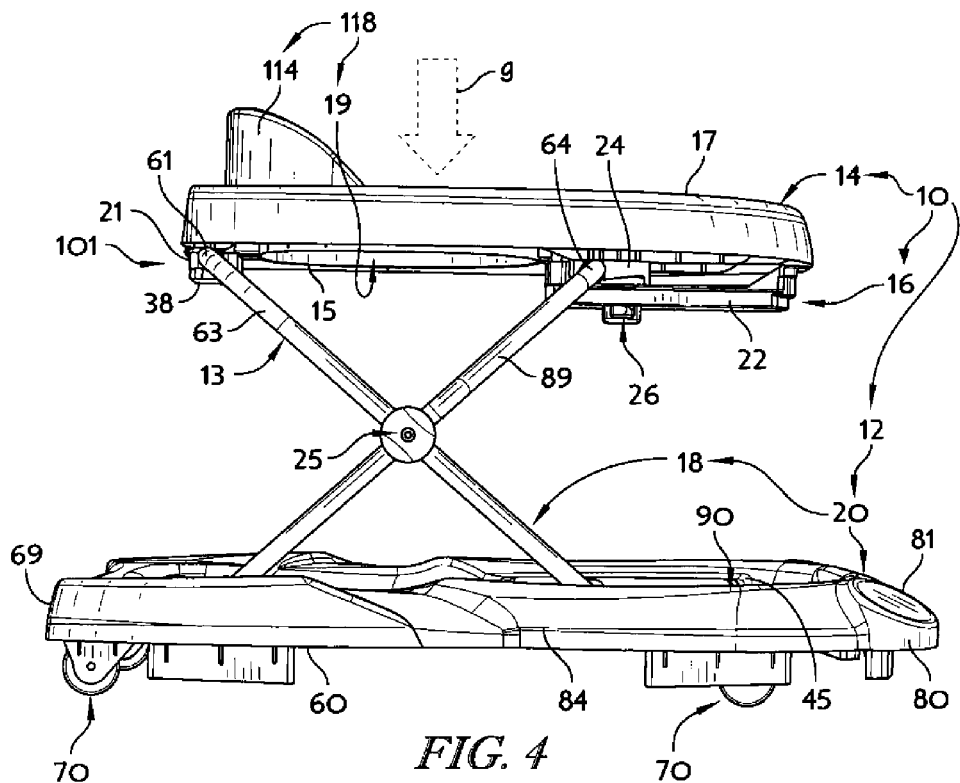
FIG. 4 is a right-side elevation view of the juvenile walker in the first expanded-use position suggesting that the juvenile walker may be lowered to the relatively lower second expanded-use position as a result of using the restraint height adjuster in as suggested in FIGS. 8-14.
Figure 5:
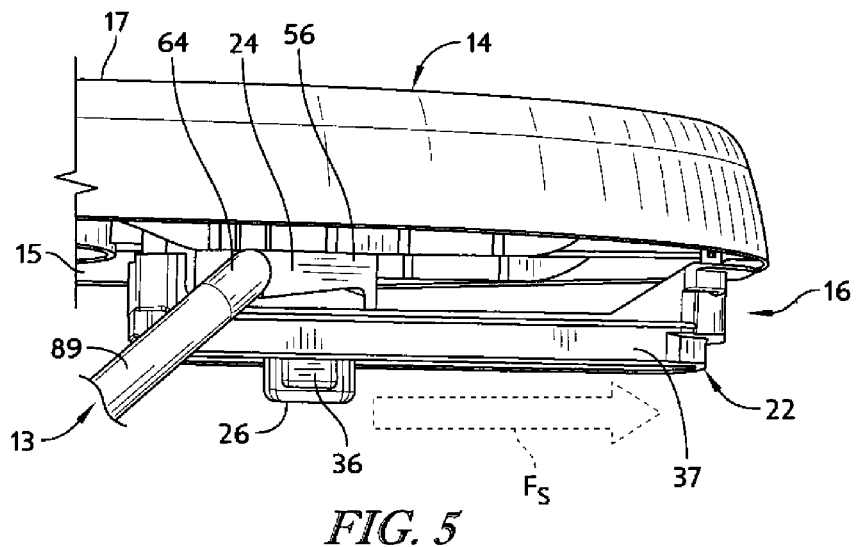
FIG. 5 is an enlarged partial view of the juvenile walker of FIG. 4 suggesting that during downward movement of the child restraint, the height lock moves in a forward direction (double phantom arrow) relative to the adjuster mount as the child restraint lowers.

As described herein and illustrated in FIGS. 12-14, juvenile walker 10 is configurable to be in multiple height positions. As an example, juvenile walker 10 is configurable to be in the first expanded-use position shown in FIGS. 1, 4, and 12, the second expanded-use position shown in FIGS. 6 and 13, the third expanded-use position, and the collapsed-storage position shown in FIG. 14. When juvenile walker 10 is in the first expanded-use position, also called the fully-expanded use position, shown in FIGS. 1, 4, and 12, child-restraint lift 18 is extended and child restraint 14 is a first height H1 above ground G as shown in FIG. 12. As a result, restraint height adjuster 16 is at a rearward position as shown in FIG. 5.

Figure 6:
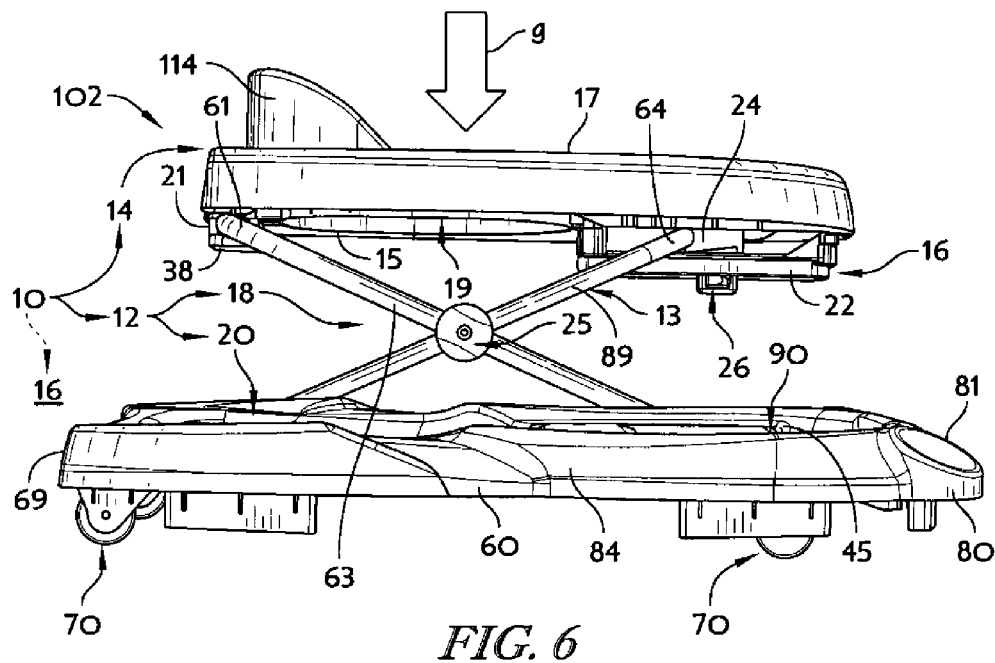
FIG. 6 is a view similar to FIG. 4 showing the juvenile walker in the relatively lower second expanded-use position.
Figure 7:
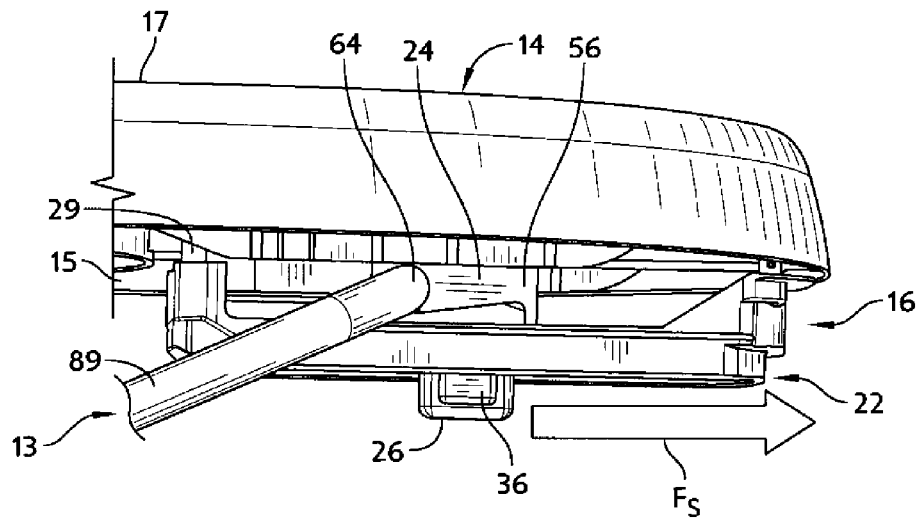
FIG. 7 is a view similar to FIG. 5 showing the height lock has moved forward relative to the adjuster mount as a result of lowering the child restraint.

When juvenile walker 10 is in the second expanded-use position, also called an intermediate-expanded use position, child-restraint lift 18 is extended partly and child restraint is a relatively shorter second height H2 above ground G as shown in FIGS. 6 and 13. As a result, restraint height adjuster 16 is at a first middle position as shown in FIG. 7.

When juvenile walker 10 is in the third expanded-use position, child-restraint lift 18 is extended partly and child restraint is a relatively shorter third height H3 above ground G. Third height H3 is less than second height H2. As a result, restraint height adjuster 16 is at a second middle position.

When juvenile walker 10 is in the collapsed-storage position, child-restraint lift 18 is collapsed and child restraint 14 is at a relatively shortest height H3 above ground G. As a result, restraint height adjuster 16 is at a forward position.

Figure 3:
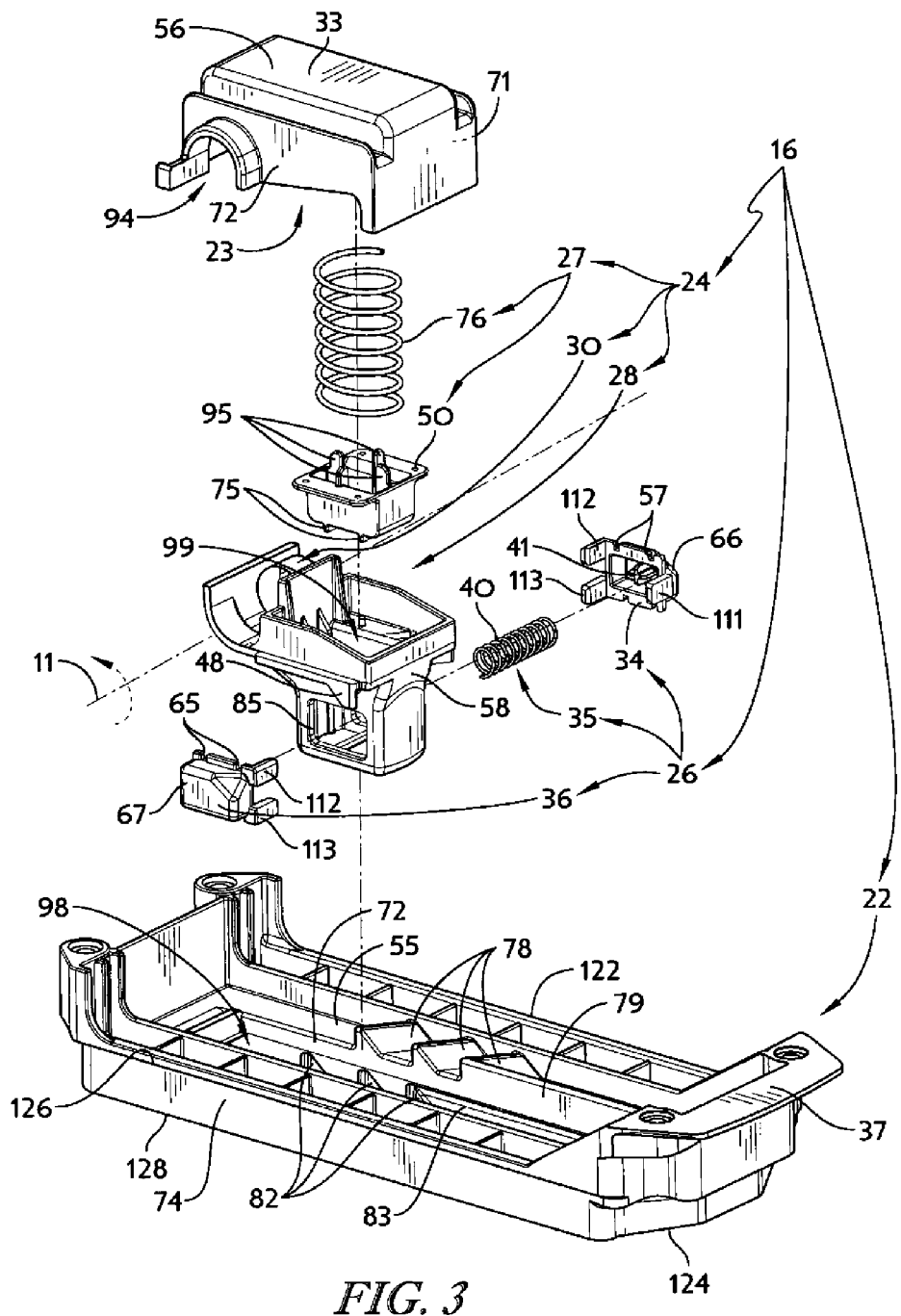

Restraint height adjuster 16 is coupled to both child restraint 14 and child-restraint lift 18 and configured to block movement of child restraint 14 relative to ground G selectively as suggested in FIGS. 8A-11B. Restraint height adjuster 16 includes an adjuster mount 22, a height lock 24, and a height-lock actuator 26, as shown in FIG. 3. Adjuster mount 22 couples restraint height adjuster 16 to child restraint 14 and interconnects child-restraint lift 18 to child restraint 14. Adjuster mount 22 is coupled to child restraint 14 in a fixed position relative to child restraint 14. As an example, adjuster mount 22 is coupled to child restraint 14 by screws or any other suitable fasteners.

As suggested in FIG. 3, height lock 24 is located between adjuster mount 22 and child restraint 14. Height-lock actuator 26 is coupled to height lock 24 and extends through a lock channel 98 formed in adjuster mount 22 as shown, for example, in FIGS. 8A-11B. Height-lock actuator 26 is coupled to height lock 24 such that movement of height lock 24 causes height-lock actuator 26 to move as suggested in FIG. 3.

Height lock 24 includes an anchor 28, a front mount-tube receiver 30, and an anchor return 27 as illustrated in FIGS. 3 and 8A-11B. Height-lock actuator 26 and anchor return 27 are located in an interior region 99 formed in height lock 24. As illustrated in FIGS. 3 and 8A-11B, height-lock actuator 26 is aligned substantially with anchor return 27 such that anchor return 27 is above height-lock actuator 26 when restraint height adjuster 16 is coupled to child restraint 14.

Height-lock actuator 26 includes a first actuator button 34, a second actuator button 36, and an actuator return 35 as shown in FIGS. 3 and 8A-11B. First actuator button 34 and second actuator button 36 are opposed diametrically to each other as shown in FIG. 3. Each actuator button 34, 36 includes a bulged portion 66 and three slide tabs 111, 112, 113 as shown in FIG. 3. Bulged portion 66 is arranged to extend away from height lock 24 as shown, for example, in FIG. 3. Bulged portion 66 of actuator buttons 34, 36 are separated from each other a distance B1 when actuator buttons are biased by actuator return 35. Actuator buttons 34, 36 extend through a pair of button apertures 85 formed in height lock 24 as suggested in FIG. 3. Actuator buttons 34, 36 are coupled to anchor return 27 and are slidable back and forth relative to one another to trap anchor return 27 therebetween.

Actuator return 35 includes a first spring receiver 41, a second spring receiver 42, and an actuator spring 40. Actuator spring 40 is located between first and second actuator buttons 34, 36 and is constrained to bias first and second actuator buttons 34, 36 away from each other when no user force is applied as suggested in FIGS. 3 and 8B. Actuator spring 40 is coupled to actuator buttons 34, 36 to provide a bias force that urges the buttons to move relative to the height lock to cause the height-lock actuator to assume the disengaged position. First spring receiver 41 and second spring receiver 42 are coupled to actuator buttons 34, 36 and couple actuator spring 40 to actuator buttons 34, 36.

A first compression force $F_C$ is applied to first actuator button 34 to overcome the bias force and move first actuator button 34 relative to height lock 24. A second compression force $F_C$ is applied to second actuator button 36 to overcome the bias force and move second actuator button 36 relative to height lock 24 such that height-lock actuator 26 moves to the engaged position. In the illustrative embodiment, first and second compression forces $F_C$ are applied in a horizontal plane 130 which is generally parallel with ground G.

Adjuster mount 22 is substantially parallel with child restraint 14 and includes a mount body 37 and an anchor receiver 55 as illustrated in FIGS. 3 and 8A-11B. Mount body 37 of adjuster mount 22 includes a first support rail 72 and a second support rail 74 and is formed to include lock channel 98. First support rail 72 and second support rail 74 together define lock channel 98 therebetween. A width distance W1 is defined between first support rail 72 and second support rail 74 and is substantially the same across adjuster mount 22. Width distance W1 defines the width of lock channel 98. Lock channel 98 provides an aperture for a portion of height lock 24 and height-lock actuator 26 to extend into lock channel 98 of adjuster mount 22.

Height-lock actuator 26 is located below adjuster mount 22 such that height-lock actuator 26 is located between adjuster mount 22 and lift carrier 20 as shown in FIGS. 8A and 8B. A distance B1 is defined between bulged portion 66 of actuator buttons 34, 36 when actuator buttons 34, 36 are biased apart from one another. Distance B1 is larger than width W1 of lock channel 98. As a result, bulged portion 66 of actuator buttons 34, 36 abuts against first and second support rails 72, 74 blocking movement of height-lock actuator 26 and height lock 24 in an upward direction towards child restraint 14 when upward force $F_U$ is applied in the upward direction as shown in FIGS. 8A-8B. Height-lock actuator 26 is in the disengaged position when distance B1 is larger than width W1 blocking movement of height lock 24. In the illustrative embodiment, upward force $F_U$ is applied in a vertical plane 132, perpendicular to horizontal plane 130.

When height-lock actuator 26 is in the disengaged position, height-lock actuator 26 blocks height lock 24 from moving from the locked position to the unlocked position. The interference between bulged portion 66 of actuator buttons 34, 36 and support rails 72, 74 is maintained by actuator spring 40 biasing actuator buttons 34, 36 apart from one another blocking height lock 24 from disengaging with adjuster mount 22.

When a user presses on actuator buttons 34, 36 with compression force $F_C$, bulged portion 66 of actuator buttons 34, 36 move toward each other to establish a relatively smaller distance B2. Relatively smaller distance B2 is less than W1 as shown in FIG. 9B. As a result, height-lock actuator 26 is in the engaged position allowing height lock 24 to be moved up and down as a result of application of upward force $F_U$. By pressing actuator buttons 34, 36 in toward each other such that height-lock actuator 26 is in the engaged position, a user may move height lock 24 to the unlocked position so that juvenile walker 10 may be reconfigured from the first extended-use position to one of the second extended-use position and the collapsed-storage position.

Adjuster mount 22 is coupled to child restraint 14 and configured to support height lock 24 and height-lock actuator 26 as suggested in FIG. 3. Adjuster mount 22 includes mount body 37 and anchor receiver 55 as illustrated in FIGS. 3 and 8A-11B. Anchor receiver 55 is coupled to mount body 37 in a fixed position and is configured to receive anchor 28 of height lock 24 therein when height lock 24 is in the locked position.

Anchor receiver 55 includes a first set of anchor teeth 78, a first track 79, a second set of anchor teeth 82, and a second track 83 as shown in FIG. 3. First set of anchor teeth 78 and first track 79 are coupled to first support rail 72 of mount body 37. Second set of anchor teeth 82 and second track 83 are coupled to second support rail 74 of mount body 37. When height lock 24 is in the locked position, anchor 28 engages first and second set of anchor teeth 78, 82. In the illustrative embodiment, first set of anchor teeth 78 and second set of anchor teeth 82 extend away from rolling base 12 toward child restraint 14.

When height lock 24 is in the unlocked position, anchor 28 engages first and second tracks 79, 83. First track 79 is configured to abut first actuator button 34 to block first actuator button 34 from moving to the disengaged position and second track 83 is configured to abut second actuator button 36 to block second actuator button 36 from moving to the disengaged position when height lock 24 is in the unlocked position.

First support rail 72 includes a top surface 122 and a bottom surface 124 spaced apart from and opposite top surface 122. Likewise, second support rail 74 includes a top surface 126 and a bottom surface 128 spaced apart from and opposite top surface 126. Top surfaces 122, 126 are about flat and, in the illustrative embodiment, top surface 122 of first support rail 72 is generally parallel with top surface 126 of second support rail 74

Lock channel 98, in which height lock 24 is arranged to lie, is formed in mount body 37 between first and second sets of anchor teeth 78, 82. As illustrated in FIGS. 3, 8A, and 8B, height lock 24 is in the locked position when first and second sets of anchor teeth 78, 82 block height lock 24 from moving along adjuster mount 22. First and second sets of anchor teeth 78, 82 are configured to receive a pair of side-locking nubs 48 included in height lock 24 when height lock 24 is in the locked position. As a result, juvenile walker 10 is secured in the chosen position.

Child restraint's 14 height above ground G is adjusted by moving height lock 24 from the locked position to the unlocked position causing side-locking nubs 48 to withdraw from engagement with first and second sets anchor teeth 78, 82. Height lock 24 is moved to the unlocked position by first engaging height-lock actuator 26 as discussed above and shown in FIGS. 8A-9B. A user may then apply upward force $F_U$ to height lock 24 towards child restraint 14 to disengage side-locking nubs 48 from first and second sets of anchor teeth 78, 82 as shown in FIGS. 10A and 10B. As a result, height lock 24 rotates about a pivot axis 11 defined by front mount-tube receiver 30 of height lock 24. Once height lock 24 has been rotated a pre-determined radial distance as a result of applying upward force $F_U$, side-locking nubs 48 are no longer blocked by first and second sets of anchor teeth 78, 82, and height lock 24 will be in the unlocked position. Once in the unlocked position, height lock 24 is free to move back and forth along adjuster mount 22 in response to user applied sliding force $F_S$ as suggested in FIGS. 10A and 10B.

First and second tracks 79, 83 are provided near first and second sets of anchor teeth 78, 82 and also are configured to locate lock channel 98 therebetween. Tracks 79, 83 provide a sliding surface for height lock 24 to move along in order to place juvenile walker 10 in the collapsed-storage position when a user applies sliding force $F_S$ to height lock 24. Once height lock 24 is in the unlocked position and side-locking nubs 48 of height lock 24 are disengaged from first and second sets of anchor teeth 78, 82, a user may apply sliding force $F_S$ to height lock 24 to slide height lock 24 into engagement with tracks 79, 83 as suggested in FIG. 10A. When height lock 24 engages with tracks 79, 83, height lock 24 is maintained in the unlocked position and gravitational forces applied to child restraint 14 will bias child restraint 14 into a lower position. Height lock 24 will be urged into the forward position causing child-restraint lift 18 to move toward the retracted position and juvenile walker 10 to assume the collapsed-storage position.

Anchor 28 of height lock 24 includes an upper shell 56, a lower shell 58, and side-locking nubs 48 as shown in FIG. 3. Side-locking nubs 48 are coupled to opposite sides of lower shell 58 and configured to engage with anchor teeth 78, 82 of adjuster mount 22. Lower shell 58 is formed to include an interior region 99 and button apertures 85 that open into interior region 99. Interior region 99 is formed to house portions of height-lock actuator 26 and anchor return 27. Actuator buttons 34, 36 of height-lock actuator 26 are configured to extend through button apertures 85 of lower shell 58 as illustrated in FIG. 3.

Front mount-tube receiver 30 is coupled to lower shell 58 of anchor 28 and is configured to receive a front mount tube 64 of child-restraint lift 18 as illustrated in FIGS. 3 and 8A-11B. Child-restraint lift 18 extends through front mount-tube receiver 30 for pivotable movement of child-restraint lift 18 relative to height lock 24 to raise or lower juvenile walker 10 into one of the first extended-use position, second extended-use position, and collapsed-storage position.

Anchor return 27 is configured to bias height lock 24 toward lift carrier 20 and includes a spring mount 50 and a spring 76. Anchor return 27 provides a bias force to lower shell 58 to cause lower shell 58 and front mount-tube receiver 30 to move relative to rolling base 12 to move height lock 24 from the unlocked position to the locked position in absence of the upward force $F_U$. Anchor return 27 is configured to apply a downward bias to height lock 24 toward lift carrier 20 when no user force is applied.

As shown in FIGS. 3 and 8A-11B, spring 76 biases height lock 24 down through lock channel 98 toward lift carrier 20. Spring 76 is configured to engage with upper shell 56 of anchor 28 in order to bias height lock 24 down into the locked position as shown in FIGS. 11A and 11B. Spring 76 is configured to move with upper shell 56. Spring 76 is coupled to spring mount 50 at spring connectors 95 of spring mount 50. Spring connectors 95 are connected to spring 76 at an end of spring 76 that is opposite of where spring 76 engages with upper shell 56.

Spring mount 50 engages anchor 28 to bias height lock 24 toward lift carrier 20 and extend height lock 24 through lock channel 98. In this way, spring mount 50 and actuator return 35 work together to bias height-lock actuator 26 into the disengaged position below mount body 37.

Spring mount 50 includes slit railings 75 that align with alignment slits 57, 65 of actuator buttons 34, 36 to permit alignment slits 57, 65 to ride along slit railings 75 when actuator buttons 34, 36 are compressed toward each other. Slit railings 75 provide constant downward pressure on actuator buttons 34, 36 due to biasing force from spring 76.

Upper shell 56 includes a first cover panel 71, a second cover panel 77, and a top panel 33 coupling first cover panel 71 and second cover panel 77 together as illustrated in FIG. 3. Upper shell 56 is formed to include a void 23 defined by first cover panel 71, second cover panel 77, and top panel 33. Anchor return 27 is configured to extend into void 23 when upper shell 56 is coupled to lower shell 58. First and second cover panels 71, 77 include leg apertures 73, 94 for child-restraint lift 18 to extend through.

Child restraint 14 of juvenile walker 10 includes a table 120 and a child seat 118 for supporting and positioning a child (not shown). Child restraint 14 is suspended above lift carrier 20 by child-restraint lift 18. Table 120 includes a downward-facing surface 15 and an upward-facing surface 17, as illustrated in FIGS. 1, 2, and 12-14. Table 120 of child restraint 14 is oriented generally in front of child seat 118 of child restraint 14.

Child seat 118 includes a seat back 114 and a seat bottom (not shown) and is formed to include a child aperture 19 for locating a child (not shown) through child restraint 14. Seat back 114 is generally positioned along the perimeter of child aperture 19 to provide a location for a child to rest his or her back while located in juvenile walker 10.

Downward-facing surface 15 of child restraint 14 faces toward lift carrier 20 and child-restraint lift 18. The perimeter of downward-facing surface 15 is substantially similar in size and shape to the perimeter of a cavity 68 in lift carrier 20. As illustrated in FIG. 2, child restraint 14 further includes a pivot-mount receiver 21 and an adjuster receiver 29. Pivot-mount receiver 21 is located behind child aperture 19 and is configured to be coupled to a rear mount tube 61 of child-restraint lift 18. Adjuster receiver 29 is located in front of child aperture 19 and is configured to be coupled to a front mount tube 64 of child-restraint lift 18.

Rolling base 12 includes child-restraint lift 18 and lift carrier 20 as shown in FIG. 2. Lift carrier 20 includes a carrier foundation 69 and rolling units 70. Rolling units 70 are coupled to lift carrier 20 to support lift carrier 20 for rolling movement on ground supporting rolling units 70. Child-restraint lift 18 is coupled to lift carrier 20 to move therewith and support child restraint 14 above lift carrier 20 as shown in FIG. 1.

Child-restraint lift 18 includes a lift frame 13, a pivot synchronizer 25, and a rear lift mount 38 as shown in FIG. 2. Lift frame 13 includes a first lift-frame support 51 and a second lift-frame support 52 as shown in FIG. 2 First lift-frame support 51 and second lift-frame support 52 are coupled together by pivot synchronizer 25 and are substantially perpendicular to each other when juvenile walker 10 is in the first expanded-use position. Rear lift mount 38 is coupled to first lift-frame support 51 and is coupled to pivot-mount receiver 21 of child restraint 14. In this way, first lift-frame support 51 is pivotable with respect to child restraint 14 about rear lift mount 38.

Child-restraint lift 18 is provided to suspend child restraint 14 at selected elevated positions above lift carrier 20 as shown in FIGS. 12-14. Child-restraint lift 18 includes first lift-frame support 51 that generally extends from a rear portion of downward-facing surface 15 of child restraint 14 to a front portion of lift carrier 20. Similarly, child-restraint lift 18 also includes second lift-frame support 52 that generally extends from a front portion of downward-facing surface 15 of child restraint 14 to a rear portion of lift carrier 20. Both lift-frame supports 51, 52 extend to and couple pivotably with opposite sides of lift carrier 20.

First lift-frame support 51 includes a rear mount tube 61, a left rear leg 62, and a right rear leg 63. Rear mount tube 61 is journaled for pivotal movement in rear lift mount 38. Left rear leg 62 and right rear leg 63 include an outwardly facing pin unit 43, 44, respectively. Outwardly facing pin units 43, 44 are coupled to and provide horizontal movement of first lift-frame support 51 along lift carrier 20 as shown in FIGS. 12-14. Lift carrier 20 includes slidable front pivots 90, 93 that couple to outwardly facing pin units 43, 44 for sliding movement of legs 62, 63 back and forth relative to lift carrier 20. Further, outwardly facing pin units 43, 44 also allow first lift-frame support 51 to pivot with respect to lift carrier 20.

Second lift-frame support 52 includes a front mount tube 64, a left front leg 88, and a right front leg 89 as shown in FIG. 2. Front mount tube 64 is journaled for pivotal movement in rear mount-tube receiver 30 as shown in FIGS. 2 and 8A-11B. Left leg 88 and right leg 89 include a pivot pin 53, 54, respectively. Pivot pins 53, 54 allow second lift-frame support 52 to pivot with respect to lift carrier 20.

Pivot synchronizer 25 includes a left pivot unit 31 and a right pivot unit 32 as shown in FIG. 2. First lift-frame support 51 and second lift-frame support 52 intersect and are coupled at a left and right pivot units 31, 32 approximately near the centers of lift-frame supports 51, 52 as shown, for example, in FIG. 2. Pivot synchronizer 25 is freely rotatable so that first lift-frame support 51 and second lift-frame support 52 are permitted to rotate with respect to each other so that child restraint 14 may assume different elevated positions relative to lift carrier 20 as illustrated in FIGS. 12 and 13.

Carrier foundation 69 includes a foundation shell 80, a left frame-support mount 59, and a right frame-support mount 60. Left frame-support mount 59 is configured to be substantially identical but a mirror image of right frame-support mount 60. As a result, only left frame-support mount 59 will be discussed in detail. Foundation shell 80 includes a front shell portion 81, a rear shell portion 96, a left shell portion 97, and a right shell portion 84 as shown in FIGS. 1 and 2. Front shell portion 81, rear shell portion 96, left shell portion 97, and right shell portion 84 are configured to support first and second lift-frame supports 51, 52. Carrier foundation 69 is formed to include a cavity 68 between and defined by front shell portion 81, rear shell portion 96, left shell portion 97, and right shell portion 84. Cavity 68 is configured to allow a child's feet to touch the ground while the child is seated in juvenile walker 10.

As illustrated in FIGS. 1 and 12-14, left frame-support mount 59 includes a left slidable front pivot 90 and a left pivot receiver 86 on a portion of left frame-support mount 59 that faces towards cavity 68. Left slidable front pivot 90 and left pivot receiver 86 facilitate connection of child-restraint lift 18 to lift carrier 20. Similarly, right frame-support mount 60 includes a right slidable front pivot 93 and a right pivot receiver 87 on a portion of right frame-support mount 60 that faces towards cavity 68. Right slidable front pivot 93 and right pivot receiver 87 facilitate connection of child-restraint lift 18 to lift carrier 20.

In addition to pivotable rotation, slidable front pivots 90, 93 are configured to permit left and right legs 62, 63 of first lift-frame support 51 to slide horizontally along left and right frame-support mounts 59, 60 of lift carrier 20, as illustrated in FIGS. 12-14. Movement of left and right legs 62, 63 of first lift-frame support 51 along slidable front pivots 90, 93 occurs when the height of juvenile walker 10 is adjusted. Movement of left and right legs 62, 63 of first lift-frame support 51 occurs at the same time and in response to movement of front mount tube 64 of second lift-frame support 52 when it is moved by height-adjustment means 16. Specifically, when juvenile walker 10 is in the first expanded-use position and a user activates restraint height adjuster 16 to lower juvenile walker 10, front mount tube 64 of second lift-frame support 52 moves away from rear mount tube 61 of first lift-frame support 51. Because first lift-frame support 51 and second lift-frame support 52 are connected at pivot synchronizer 25, lift-frame supports 51, 52 collapse substantially at the same rate because of pivot synchronizer 25. This collapsing forces left and right legs 62, 63 to slide along slidable front pivots 90, 93 as indicated in FIGS. 12-14.

Slidable front pivots 90, 93 include a back stop member 46, 47, respectively, and a front stop member, 45, 49, respectively, that define the length of slidable front pivots 90, 93. Back stop members 46, 47 are located between front stop members 45, 49 and pivot receivers 86, 87, respectively. Outwardly facing pin units 43, 44 of left and right legs 62, 63 are permitted to slide along slidable front pivots 90, 93 from a position near back stop members 46, 47 to a position near front stop members 45, 49 as illustrated in FIGS. 1 and 12-14. As outwardly facing pin units 43, 44 slide along slidable front pivots 90, 93, first lift-frame support 51 pivots with respect to lift carrier 20. When outwardly facing pin units 43, 44 are located in slidable front pivots 90, 93 near back stop members 46, 47, juvenile walker 10 will be in the first extended-use position as shown in FIGS. 1 and 12. When outwardly facing pin units 43, 44 are located in slidable front pivots 90, 93 near front stop members 45, 49, juvenile walker 10 will be in the collapsed-storage position as shown in FIGS. 12-14.

The invention claimed is:

1. A juvenile walker comprising
a rolling base adapted to roll over ground underlying and supporting the rolling base,
a child restraint coupled to the rolling base and adapted to support a child at various heights above ground, and
a restraint height adjuster configured to provide means for adjusting a position of the child restraint relative to ground to cause the juvenile walker to be arranged to accommodate children of varying sizes in response to application of at least a first compression force which frees portions of the restraint height adjuster to move in response to application of an upward force away from the rolling base that frees the child restraint to move up and down relative to ground so that inadvertent movement of the child restraint is blocked in absence of both the first compression force and the upward force.

2. The juvenile walker of claim 1, wherein the restraint height adjuster includes an adjuster mount coupled to the child restraint in a fixed position relative to the child restraint, a height lock coupled to the adjuster mount to move relative to the adjuster mount between a locked position in which movement of the child restraint relative to the rolling base is blocked and an unlocked position in which movement of the child restraint relative to the rolling base is permitted, and a height-lock actuator coupled to the height lock to move relative to the height lock between an engaged position in which the height lock is freed to move between the locked and unlocked positions and a disengaged position in which the height lock is blocked from moving between the locked and unlocked position.

3. The juvenile walker of claim 2, wherein the adjuster mount includes a mount body coupled to the child restraint in a fixed position relative to the child restraint and an anchor receiver coupled to the mount body, the mount body includes a first support rail and a second support rail spaced apart from the first support rail to define a lock channel therebetween, and the anchor receiver is configured to engage the height lock and a portion of the height lock is arranged to extend through the lock channel when the height lock is in the locked position.

4. The juvenile walker of claim 3, wherein the height lock is formed to include an interior region, a first button aperture arranged to open into the interior region, and a second button aperture arranged to open into the interior region and the height-lock actuator includes a first button arranged to extend through the first button aperture to engage the first support rail when the height lock is in the locked position and the height-lock actuator is in the disengaged position and arranged to lie in the interior region and disengage the first support rail when the height-lock actuator is moved to the engaged position, a second button arranged to extend through the second button aperture to engage the second support rail when the height lock is in the locked position and the height-lock actuator is in the disengaged position and arranged to lie in the interior region and disengage the second support rail when the height-lock actuator is moved to the engaged position, and a first bias member located between and coupled to the first and second buttons and configured to provide associated bias forces to the first and second buttons that urge the first and second buttons to move relative to the height lock to cause the height-lock actuator to assume the disengaged position.

5. The juvenile walker of claim 2, wherein the height-lock actuator includes a first button and a second button, the first compression force is applied to the first button and a second compression force is applied to the second button to move the height-lock actuator from the disengaged position to the engaged position, and the upward force is applied to the height lock when the height-lock actuator is in the engaged position to move the height lock from the locked position to the unlocked position.

6. The juvenile walker of claim 2, wherein the adjuster mount includes a mount body coupled to the child restraint and an anchor receiver coupled to the mount body, the anchor receiver includes a first track, a first set of anchor teeth coupled to the first track, a second track, and a second set of anchor teeth coupled to the second track, the height lock slides on the mount body relative to the first and second tracks when the height lock is in the unlocked position, and the height lock engages the first and second set of anchor teeth to block sliding of the height lock when the height lock is in the locked position.

7. The juvenile walker of claim 2, wherein the adjuster mount is formed to include a lock channel and the height lock includes an anchor coupled to the adjuster mount to move relative to the adjuster mount, a front mount-tube receiver coupled to the anchor to move therewith and coupled to the rolling base to move relative to the rolling base, and an anchor return coupled to the anchor to move relative to the anchor and configured to urge the anchor to extend through the lock channel.

8. The juvenile walker of claim 2, wherein the height lock includes an anchor and an anchor return, the anchor includes an upper shell and a lower shell configured to provide an interior region and the anchor return includes a spring mount coupled to the lower shell and configured to be received in the interior region of the lower shell and a bias member coupled to the spring mount and the upper shell and arranged to urge the spring mount into the interior region of the lower shell to bias the lower shell downwardly away from the child restraint into the locked position.

9. The juvenile walker of claim 1, wherein the restraint height adjuster includes a height lock movable between a locked position in which movement of the child restraint relative to the rolling base is blocked and an unlocked position in which movement of the child restraint relative to the rolling base is permitted and a height-lock actuator movable between an engaged position in which the height lock is freed to move between the locked and unlocked positions and a disengaged position in which the height lock is blocked from moving between the locked and unlocked position and the height-lock actuator includes a first button and a bias member coupled to the first button to provide a bias force that urges the first button to move relative to the height lock to move the height-lock actuator to the disengaged position.

10. The juvenile walker of claim 9, wherein the first compression force is applied to the first button to overcome the bias force and move the first button relative to the height lock to move the height-lock actuator to the engaged position.

11. The juvenile walker of claim 9, wherein the height-lock actuator further includes a second button and the bias member is coupled to the second button to provide a second bias force that urges the second button to move relative to the height lock to move the height-lock actuator to the disengaged position.

12. The juvenile walker of claim 11, wherein a second compression force is applied to the second button to overcome the second bias force and move the second button relative to the height lock to the move the height-lock actuator to the engaged position.

13. The juvenile walker of claim 1, wherein the restraint height adjuster includes an adjuster mount and a height lock including an anchor coupled to the adjuster mount to move relative to the adjuster mount, a front mount-tube receiver coupled to the anchor to move therewith and coupled to the rolling base to move relative to the rolling base, and an anchor return coupled to the anchor to move relative to the anchor and the anchor and the front mount-tube receiver are free to move relative to the adjuster mount after the upward force is applied to the height lock to move the height lock toward the child restraint.

14. The juvenile walker of claim 13, wherein the height lock is movable between a locked position in which movement of the child restraint relative to the rolling base is blocked and an unlocked position in which movement of the child restraint relative to the rolling base is permitted and the anchor includes an upper shell and a lower shell coupled to the upper shell to move relative to the upper shell to cause the height lock to move between the locked position and the unlocked position.

15. The juvenile walker of claim 14, wherein the anchor return provides a bias force to the lower shell to cause the lower shell and the front mount-tube receiver to move relative to the rolling base to move the height lock from the unlocked position to the locked position in absence of the upward force.

16. The juvenile walker of claim 13, wherein the restraint height adjuster further includes a height-lock actuator movable between an engaged position in which the height lock is freed to move between the locked and unlocked positions and a disengaged position in which the height lock is blocked from moving between the locked and unlocked position, the anchor includes an upper shell and a lower shell coupled to the upper shell to move relative to the upper shell to cause the height lock to move between the locked position and the unlocked position, and the lower shell of the anchor is formed to include an interior region and at least one button aperture arranged to open into the interior region and a portion of the height-lock actuator is located in the interior region.

17. The juvenile walker of claim 16, wherein the anchor return includes a spring mount coupled to the lower shell and a bias member coupled to the spring mount and configured to bias the spring mount into the interior region of the lower shell and the spring mount is coupled to the lower shell to move therewith toward the upper shell when the upward force is applied to the height lock, and wherein the bias member is further coupled to the upper shell of the anchor to move therewith.

18. The juvenile walker of claim 1, wherein the restraint height adjuster includes a height lock and an adjuster mount including a mount body coupled to the child restraint in a fixed position relative to the child restraint and an anchor receiver coupled to the mount body in a fixed position relative to the mount body and configured to support the height lock thereon.

19. The juvenile walker of claim 18, wherein the height lock is movable between a locked position in which movement of the child restraint relative to the rolling base is blocked and an unlocked position in which movement of the child restraint relative to the rolling base is permitted, the restraint height adjuster further includes a height-lock actuator coupled to the height lock to move relative to the height lock between an engaged position in which the height lock is freed to move between the locked and unlocked positions and a disengaged position in which the height lock is blocked from moving between the locked and unlocked position, and the mount body includes a first support rail and a second support rail spaced apart from the first support rail to define a lock channel therebetween and a portion of the height lock is arranged to extend through the lock channel when the height lock is in the locked position.

20. The juvenile walker of claim 18, wherein the height lock slides on the mount body to cause the child restraint to move relative to the rolling base in response to a sliding force applied to the child restraint after the upward force is applied to the height lock.

21. The juvenile walker of claim 18, wherein the anchor receiver includes a first track and a first set of anchor teeth coupled to the first track.

22. The juvenile walker of claim 21, wherein the anchor receiver includes a second track and a second set of anchor teeth coupled to the second track.

23. The juvenile walker of claim 21, wherein the first set of anchor teeth extend away from the rolling base toward the child restraint.

24. The juvenile walker of claim 1, wherein the restraint height adjuster includes an adjuster mount including a first support rail, a first track coupled to the first support rail, and a first set of anchor teeth coupled to the first track to extend toward the child restraint, a height lock including an anchor coupled to and supported by the first support rail for sliding movement relative to the first track, a front mount-tube receiver arranged to interconnect the anchor and the rolling base to cause the anchor and the front mount-tube receiver to move together relative to the rolling base and an anchor return coupled to the anchor to bias the height lock away from the child restraint, and a height-lock actuator including a first button coupled to the anchor to move relative to the anchor and a bias member coupled to the first button and arranged to provide a bias force to the first button that urges the first button to move relative to the anchor and away from the first track.

25. The juvenile walker of claim 24, wherein the adjuster mount is coupled to the child restraint, the height lock is movable between a locked position in which movement of the child restraint relative to the rolling base is blocked and an unlocked position in which movement of the child restraint relative to the rolling base is permitted, the height-lock actuator is movable between an engaged position in which the height lock is freed to move between the locked and unlocked positions and a disengaged position in which the height lock is blocked from moving between the locked and unlocked position, and the first compression force is applied to the first button to overcome the bias force and move the height-lock actuator to the engaged position.

26. The juvenile walker of claim 25, wherein the anchor and the front mount-tube receiver are free to move relative to the rolling base when the upward force is applied to the height lock to move the height lock from the locked position to the unlocked position.

27. The juvenile walker of claim 25, wherein the anchor and the front mount-tube receiver are free to move relative to the rolling base when the upward force is applied to the height lock to move the height lock from the locked position to the unlocked position, the height-lock actuator further includes a second button and the bias member is located between and arranged to interconnect the first and second buttons to provide a bias force that urges the first and second buttons away from one another toward the disengaged position, the first compression force is applied to the first button and a second compression force is applied to the second button to overcome the bias force and move the first and the second buttons relative to the anchor toward one another to the engaged position to free the anchor and the front mount-tube receiver to pivot away from the first set of anchor teeth of the adjuster mount in response to application of the upward force.

28. The juvenile walker of claim 24, wherein the anchor includes an anchor body coupled to the front mount-tube receiver and a side-locking nub coupled to the anchor body to engage the first set of anchor teeth in absence of the upward force and to be disengaged from the first set of anchor teeth after the upward force is applied to the height lock.

29. The juvenile walker of claim 28, wherein the height lock slides relative to the first track in response to application of a sliding force by a user to the height lock when the side-locking nub is disengaged from the first set of anchor teeth.

30. The juvenile walker of claim 28, wherein the anchor is formed to include an interior region and a button aperture opening into the interior region and the first button is arranged to extend out of the interior region through the button aperture when the side-locking nub is engaged with the first set of anchor teeth and lie entirely in the interior region when the side-locking nub is disengaged from the first set of anchor teeth.

31. The juvenile walker of claim 24, wherein the height lock is movable between a locked position in which movement of the child restraint relative to the rolling base is blocked and an unlocked position in which movement of the child restraint relative to the rolling base is permitted, the adjuster mount further includes a second support rail, a second track coupled to the second support rail, and a second set of anchor teeth coupled to the second track to extend toward the child restraint, the first support rail is spaced apart from the second support rail to form a lock channel therebetween, and the height lock is arranged to extend into the lock channel when the height lock is in the locked position.

32. The juvenile walker of claim 31, wherein the height-lock actuator is movable between an engaged position in which the height lock is freed to move between the locked and unlocked positions and a disengaged position in which the height lock is blocked from moving between the locked and unlocked position and the first track abuts the first button to block the first button from moving to the disengaged position when the height lock is in the unlocked position.

33. The juvenile walker of claim 31, wherein the height-lock actuator is movable between an engaged position in which the height lock is freed to move between the locked and unlocked positions and a disengaged position in which the height lock is blocked from moving between the locked and unlocked position, the height-lock actuator further includes a second button coupled to the anchor to move relative to the anchor, the bias member is coupled to the second button and arranged to provide a bias force that urges the second button to move relative to the anchor into the disengaged position, the first button engages the first support rail and the second button engages the second support rail to block movement of the height lock when the height-lock actuator is in the disengaged position, and the first and second buttons disengage the first and second support rails to allow movement of the height lock when the height-lock actuator is in the engaged position.

34. The juvenile walker of claim 1, wherein the restraint height adjuster includes a height lock movable between a locked position in which movement of the child restraint relative to the rolling base is blocked and an unlocked position in which movement of the child restraint relative to the rolling base is permitted and a height-lock actuator movable between an engaged position in which the height lock is freed to move between the locked and unlocked positions and a disengaged position in which the height lock is blocked from moving between the locked and unlocked position and the first compression force and a second compression force are applied to the height-lock actuator to move the height-lock actuator from the disengaged position to the engaged position.

35. The juvenile walker of claim 34, wherein the height-lock actuator is biased into the disengaged position in absence of the first and second compression forces.

36. The juvenile walker of claim 35, wherein the first and second compression forces are applied to the height-lock actuator in a horizontal plane.

37. The juvenile walker of claim 35, wherein the upward force is applied in a direction perpendicular to a direction of the first and second compression forces.

38. The juvenile walker of claim 34, wherein the upward force is applied to the height lock to move the height lock from the locked position to the unlocked position.

39. The juvenile walker of claim 38, wherein the height lock is biased into the locked position in absence of the upward force.

40. The juvenile walker of claim 38, wherein the upward force is applied in a vertical plane.

41. A juvenile walker comprising
a rolling base adapted to roll over ground underlying and supporting the rolling base,
a child restraint coupled to the rolling base and adapted to support a child at various heights above ground, and
a restraint height adjuster including an adjuster mount coupled to the child restraint in a fixed position relative to the child restraint, a height lock coupled to the adjuster mount to move relative to the adjuster mount between a locked position in which movement of the child restraint relative to the rolling base is blocked and an unlocked position in which movement of the child restraint relative to the rolling base is permitted, and a height-lock actuator coupled to the height lock to move relative to the height lock between an engaged position in which the height lock is freed to move between the locked and unlocked positions and a disengaged position in which the height lock is blocked from moving between the locked and unlocked position, and the restraint height adjuster is configured to adjust a position of the child restraint relative to ground to cause the juvenile walker to be arranged to accommodate children of varying sizes in response to application of first and second compression forces applied to the height-lock actuator that free the height-lock actuator to move in response to application of a upward force to the height lock causing the height lock to move to the unlocked position so that inadvertent movement of the child restraint is blocked in absence of both the first and second compression forces and the upward force.

42. The juvenile walker of claim 41, wherein the height lock includes an anchor return and an anchor, the anchor includes an upper shell and a lower shell formed to define an interior region, the anchor return includes a spring mount coupled to the lower shell and a second bias member coupled to the spring mount and the upper shell to urge the spring mount into the interior region of the lower shell to cause the lower shell to move downwardly so that the height lock assumes the locked position.

43. The juvenile walker of claim 41, wherein the adjuster mount includes a mount body and an anchor receiver coupled to the mount body, the mount body includes a first support rail and a second support rail, the anchor receiver includes a first set of anchor teeth and a second set of anchor teeth, the height lock translates on the first and second support rails relative to the anchor receiver when the height lock is in the unlocked position, and the height lock engages the first and second set of anchor teeth to block translation of the height lock when the height lock is in the locked position.

44. The juvenile walker of claim 41, wherein the adjuster mount includes a mount body coupled to the child restraint in a fixed position relative to the child restraint and an anchor receiver coupled to the mount body, the mount body includes a first support rail and a second support rail spaced apart from the first support rail to define a lock channel therebetween, and a portion of the height lock is arranged to extend into the lock channel to cause the height-lock actuator to engage the first and second support rails when the height lock is in the locked position and the height-lock actuator is in the disengaged position.

45. The juvenile walker of claim 41, wherein the height-lock actuator includes a first button and a second button and the first compression force is applied to the first button and the second compression force is applied to the second button to cause the height-lock actuator to move from the disengaged position to the engaged position and the upward force is applied to the height lock when the height-lock actuator is in the engaged position to cause the height lock to move from the locked position to the unlocked position.

46. The juvenile walker of claim 41, wherein the adjuster mount includes a first support rail and a second support rail and the height lock slides on the first and second support rails to cause the child restraint to move relative to the rolling base in response to a sliding force applied to the child restraint when the height lock is in the unlocked position.

47. The juvenile walker of claim 46, wherein the height lock is formed to include an interior region, a first button aperture that opens into the interior region, and a second button aperture that opens into the interior region and the height-lock actuator includes a first button arranged to extend through the first button aperture to engage the first support rail when the height lock is in the locked position and the height-lock actuator is in the disengaged position and arranged to lie in the interior region and disengage from the first support rail when the height-lock actuator is moved to the engaged position, a second button arranged to extend through the second button aperture to engage the second support rail when the height lock is in the locked position and the height-lock actuator is in the disengaged position and arranged to lie in the interior region disengaged from the second support rail when the height-lock actuator is moved to the engaged position, and a first bias member located between the first and second buttons and configured to provide a first bias force that urges the first button to move relative to the height lock to the disengaged position and a second bias force that urges the second button to move relative to the height lock to the disengaged position.

48. The juvenile walker of claim 47, wherein the height lock includes an anchor formed to include the interior region, the first button aperture, and the second button aperture and is coupled to the adjuster mount to move relative to the adjuster mount, a front mount-tube receiver coupled to the anchor to move therewith and coupled to the rolling base to move relative to the rolling base, and an anchor return coupled to the anchor to move relative to the anchor and configured to bias the anchor to extend into the lock channel.

* * * * *